(12) United States Patent
Rybski

(10) Patent No.: US 11,078,965 B1
(45) Date of Patent: Aug. 3, 2021

(54) HUB BEARING UNIT WITH RADIAL AND AXIAL DISPLACEMENT LIMITER

(71) Applicant: AKTIEBOLAGET SKF, Gothenburg (SE)

(72) Inventor: David Christopher Rybski, White Lake, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/742,781

(22) Filed: Jan. 14, 2020

(51) Int. Cl.
| | |
|---|---|
| F16C 33/76 | (2006.01) |
| F16C 33/78 | (2006.01) |
| F16C 19/18 | (2006.01) |
| F16C 33/38 | (2006.01) |
| B60B 27/00 | (2006.01) |
| B60B 27/06 | (2006.01) |

(52) U.S. Cl.
CPC ...... *F16C 33/7843* (2013.01); *B60B 27/0005* (2013.01); *B60B 27/065* (2013.01); *F16C 19/181* (2013.01); *F16C 19/186* (2013.01); *F16C 33/3887* (2013.01); *F16C 2326/02* (2013.01)

(58) Field of Classification Search
CPC .. F16C 19/186; F16C 19/386; F16C 33/7843; F16C 33/7859; F16C 33/7863; F16C 33/7866; F16C 33/7879; F16C 33/7883; F16C 2326/02; B60B 27/0005; B60B 27/001; B60B 27/0073; B60B 27/065
See application file for complete search history.

(56) References Cited

U.S. PATENT DOCUMENTS

| | | | |
|---|---|---|---|
| 8,845,203 B2 | 9/2014 | Meeker et al. | |
| 9,283,808 B2 | 3/2016 | Meeker et al. | |
| 2004/0170344 A1* | 9/2004 | Tajima | G01P 3/443 |
| | | | 384/448 |
| 2008/0187262 A1* | 8/2008 | Niebling | F16C 19/52 |
| | | | 384/477 |

FOREIGN PATENT DOCUMENTS

DE  102017129960 A1  6/2019

* cited by examiner

*Primary Examiner* — Phillip A Johnson
(74) *Attorney, Agent, or Firm* — J-TEK Law PLLC; Scott T. Wakeman; Mark A. Ussai

(57) ABSTRACT

A hub bearing unit includes an inner ring having inboard and outboard axial ends and a bearing inner race on an outer surface. An outer ring disposed about the inner ring has inboard and outboard axial ends and a bearing outer race on an inner surface. One ring is coupled with a wheel and rotatable about an axis and the other ring is fixedly coupled with a frame. A plurality of rolling elements is rollable upon the inner and outer races. A displacement limiter extends radially from one ring and has a frustoconical stop surface spaced radially from a surface of the other ring. The limiter stop surface engages with the ring surface when the ring displaces radially and/or axially relative to the other ring to prevent brinelling impacts on the bearing races. Preferably, the displacement limiter is located axially between the rolling elements and the ring inboard ends.

20 Claims, 6 Drawing Sheets

US 11,078,965 B1

HUB BEARING UNIT WITH RADIAL AND AXIAL DISPLACEMENT LIMITER

BACKGROUND OF THE INVENTION

The present invention relates to bearings, and more particularly to wheel hub units.

Wheel hub units are known and are typically provided to rotatably couple a wheel to a vehicle frame. A wheel hub unit includes an inner ring, and outer ring and rolling elements disposed between the inner and outer rings, with the wheel being mounted to one ring and the other ring being connected with the frame through a shaft, a suspension assembly or a steering mechanism. When the wheel experiences a side impact of a sufficient magnitude, the impact can cause bending of the ring coupled with the wheel, resulting in relative radial and axial displacement between the rings. Such relative displacement may result in the rolling elements impacting the races with a sufficient force to indent the race surfaces. These indentations or "brinelling" may adversely affect operation of the bearings and can lead to premature wear and failure of the bearing races.

SUMMARY OF THE INVENTION

In one aspect, the present invention is a hub bearing unit for rotatably coupling a wheel with a vehicle frame. The hub bearing unit comprises an inner ring having an inboard axial end, an outboard axial end, an outer circumferential surface and at least one bearing inner race disposed on the outer surface. An outer ring is disposed about the inner ring and has an inboard axial end, an outboard axial end, an inner circumferential surface and at least one bearing outer race disposed on the ring inner surface. One of the inner ring and the outer ring is coupled with the wheel so as to rotate about a central axis and the other one of the inner ring and the outer ring being is coupled with the frame. A plurality of rolling elements are rollable upon the inner and outer races to rotatably couple the inner and outer rings. Further, a displacement limiter extends radially from the inner ring outer surface or from the outer ring inner surface. The limiter has a generally frustoconical stop surface spaced radially and axially from the outer ring inner surface or from the inner ring outer surface. The stop surface engages with the outer ring or with the inner ring when one of the inner ring and the outer ring displaces radially or axially relative to the other one of the inner ring and the outer ring.

In another aspect, the present invention is again a hub bearing unit for rotatably coupling a wheel with a vehicle frame. The hub bearing unit comprises an inner ring coupled with the wheel so as to be rotatable about a central axis. The inner ring has an inboard axial end, an outboard axial end, an outer circumferential surface and at least one bearing inner race disposed on the outer surface. An outer ring is coupled with the frame and disposed about the inner ring and has an inboard axial end, an outboard axial end, an inner circumferential surface, at least one bearing outer race disposed on the ring inner surface and a concave, generally frustoconical engagement surface section of the inner surface. A plurality of rolling elements are rollable upon the inner and outer races to rotatably couple the inner and outer rings. A displacement limiter extends radially outwardly from the inner ring outer surface and has a convex, generally frustoconical stop surface spaced radially and axially from the engagement surface on the outer ring. The stop surface contacts the engagement surface when the inner ring displaces radially or axially relative to the outer ring.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
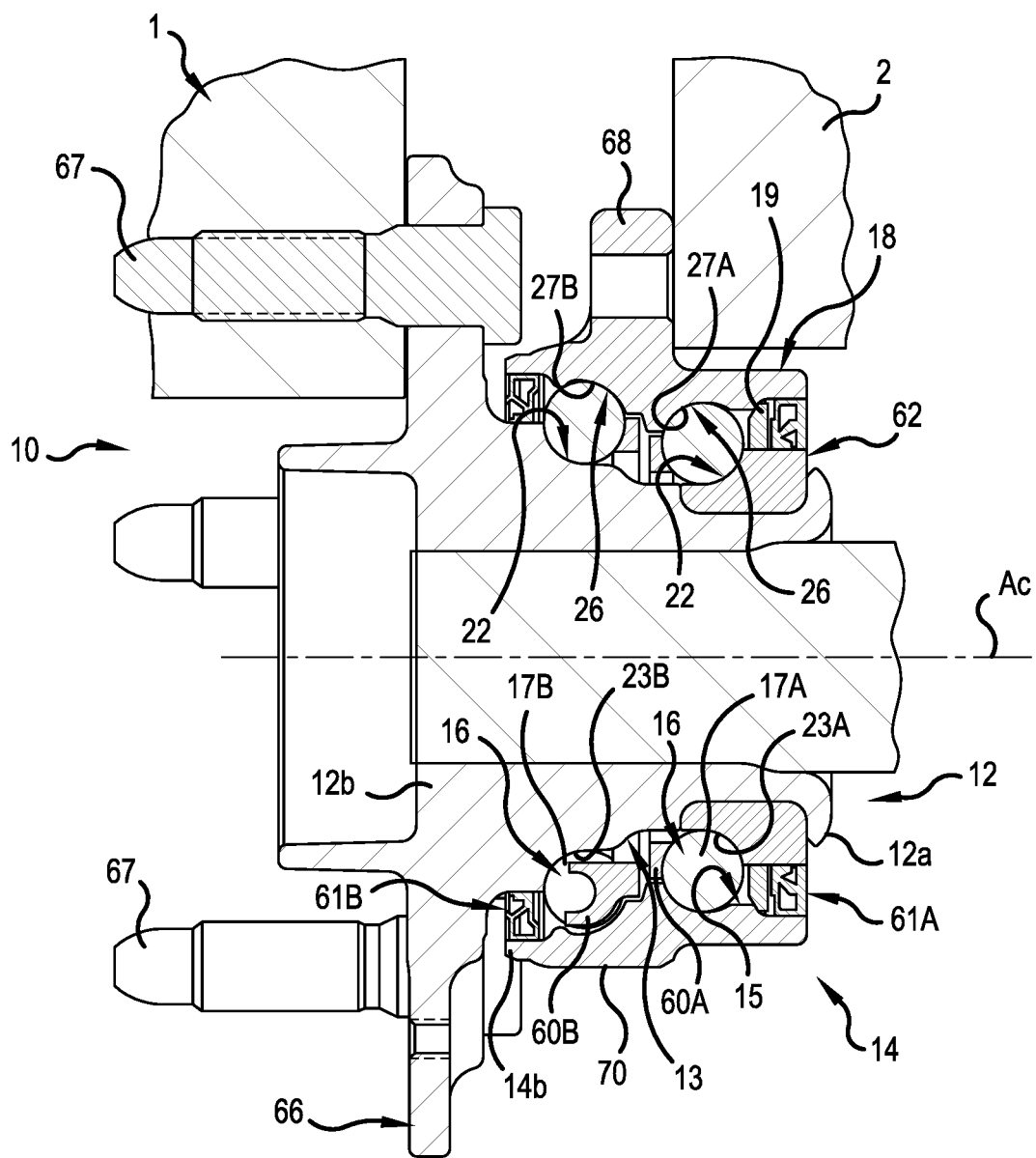
FIG. 1 is an axial cross-sectional view of a hub bearing unit with an axial and radial displacement limiter in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a hub bearing unit 10 for rotatably coupling a wheel 1 with a vehicle frame 2 (indicated in FIG. 1), preferably through a steering mechanism or a suspension, or with a powertrain (not shown). The hub bearing unit 10 basically comprises an inner ring 12, an outer ring 14 disposed about the inner ring 12, at least one plurality or "row" of rolling elements 16 disposed between the inner and outer rings 12, 14 and a displacement limiter 18 configured to limit relative radial and axial displacements between the rings 12, 14. More specifically, the inner ring 12 is generally cylindrical and has an inboard axial end 12a, an outboard axial end 12b, an outer circumferential surface 13 and at least one bearing inner race 22 disposed on the outer surface 13, and preferably has a central bore 24 configured to receive a shaft 3 coupled with the vehicle frame 2. The outer ring 14 is generally tubular and has an inboard axial end 14a, an outboard axial end 14b, an inner circumferential surface 15 and at least one bearing outer race 26 disposed on the ring inner surface 15.

As discussed in further detail below, one of the inner and outer rings 12, 14 is coupled with the wheel 1 so as to be rotatable about a central axis $A_C$ and the other one of the inner and outer rings 12, 14 is fixedly or "non-rotatably" coupled with the frame 2. Further, the plurality of rolling elements 16 are rollable simultaneously upon the inner and outer races 22, 26 so as to rotatably couple the inner and outer rings 12, 14. Preferably, the rolling elements 16 are generally spherical balls, but may alternatively be cylindrical rollers, tapered rollers, needles or any other type of rolling element. Preferably, the inner ring 12 and the outer ring 14 are formed of a metallic material, such as high or medium carbon steels, and the rolling elements 16 are either formed of a metallic material, for example chromium steel, or a ceramic material such as aluminum oxide.

Further, the displacement limiter 18 is either formed as a single annular body 30 or as a plurality of arcuate segments (not depicted), as described in detail below. With either construction, the limiter 18 extends radially from the inner ring outer surface 13 or from the outer ring inner surface 15 and has a frustoconical stop surface 19 spaced radially from the outer ring inner surface 15 or from the inner ring outer surface 13. In other words, when the limiter 18 extends radially outwardly from the outer surface 13 of the inner ring 12, the stop surface 19 is spaced radially inwardly from the inner surface 15 of the outer ring 14 or from an inner circumferential surface of a component (none shown) disposed within the ring inner surface 15. Conversely, when the limiter 18 extends radially inwardly from the inner surface 15 of the outer ring 14, the stop surface 19 is spaced radially outwardly from the outer surface 13 of the inner ring 12 or from an outer circumferential surface of a component (none shown) disposed on the ring outer surface 13.

Figure 4:
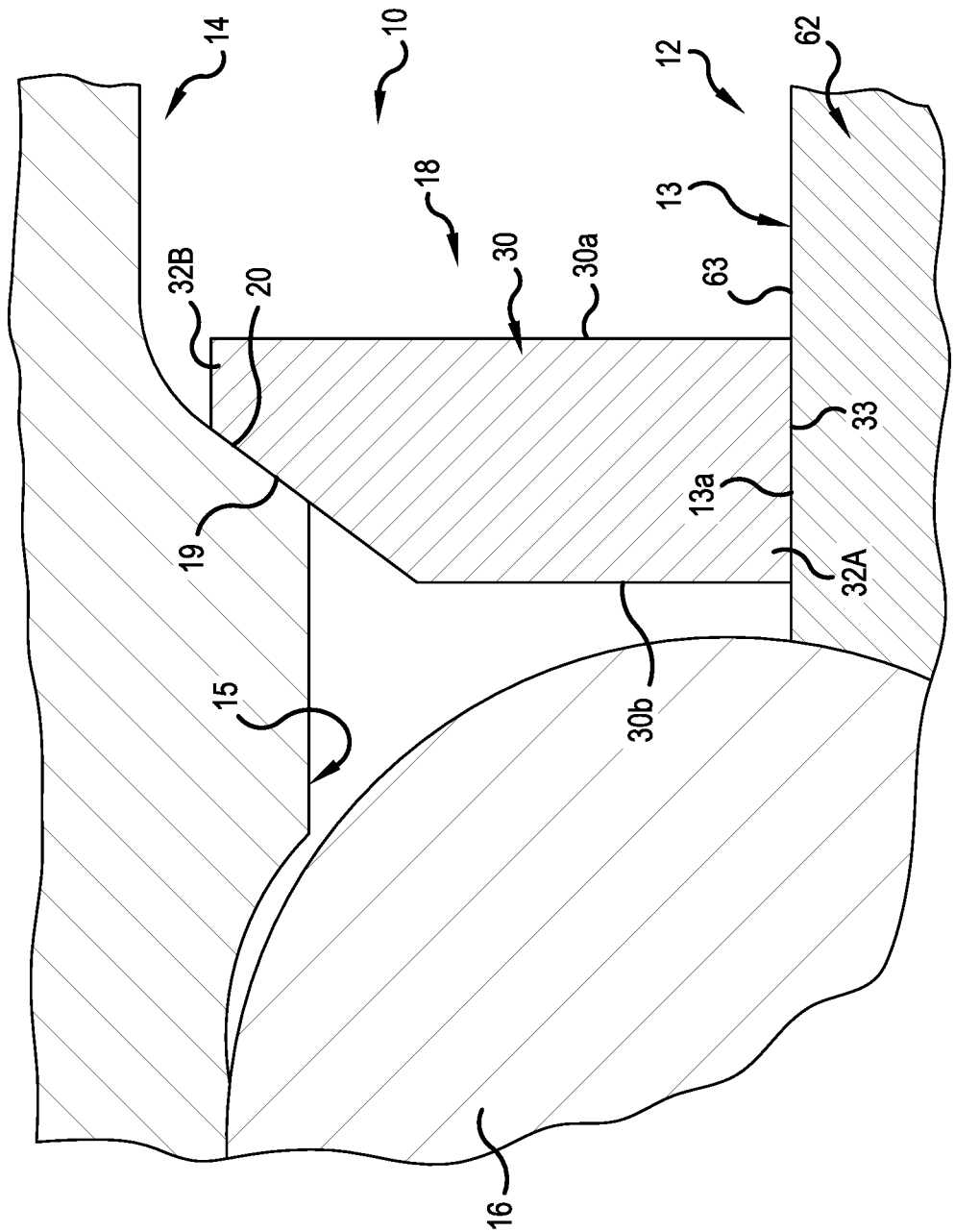
FIG. 4 is another view of the portion of the hub bearing unit of FIG. 3, showing the displacement limiter in contact with the ring engagement surface.

In either case, the limiter 18 is configured such that the frustoconical stop surface 19 contacts the outer ring inner surface 13 or the inner ring outer surface 15, i.e., directly or through a connected component, when one of the inner and outer rings 12, 14 displaces radially and/or axially relative to the other one of the inner and outer rings 12, 14, as depicted in FIG. 4. Thereby, the displacement limiter 18 functions to "limit" the total potential relative radial and axial displacement between the rings 12, 14, particularly during a bending event experienced by the wheel 1, so as to reduce or eliminate any potential impact damage to the bearing races 22, 26, as elaborated hereafter. Having described the basic components and functions above, these and other structural components of the hub bearing unit 10 are described in greater detail below.

Preferably, the frustoconical stop surface 19 is contactable with a specially formed (e.g., machined, forged, stamped, etc.) engagement surface 20 on the outer ring 14 or on the inner ring 12 which extends both axially and radially with respect to the central axis $A_C$. Most preferably, the engagement surface 20 is frustoconical and complementary with the stop surface 19, such that the engagement surface 20 is generally concave when the stop surface 19 is generally convex, and vice-versa. However, the engagement surface 20 may be provided by a curved surface or even a relatively sharp "corner" (neither shown) on one of the rings 12, 14 and contactable with the stop surface 19 of the limiter 18 on the other ring 14, 12 in order to limit axial and radial displacements. Further, the engagement surface 20 may be provided by a section of the inner surface 15 of the outer ring 14, a section of the outer surface 13 of the inner ring 12 or by circumferential or arcuate surface of a component mounted on one of the inner and outer rings 12, 14. For example, such a separate component may be a race insert 62 (described below), a rigid seal member (not shown), etc.

Figure 3:
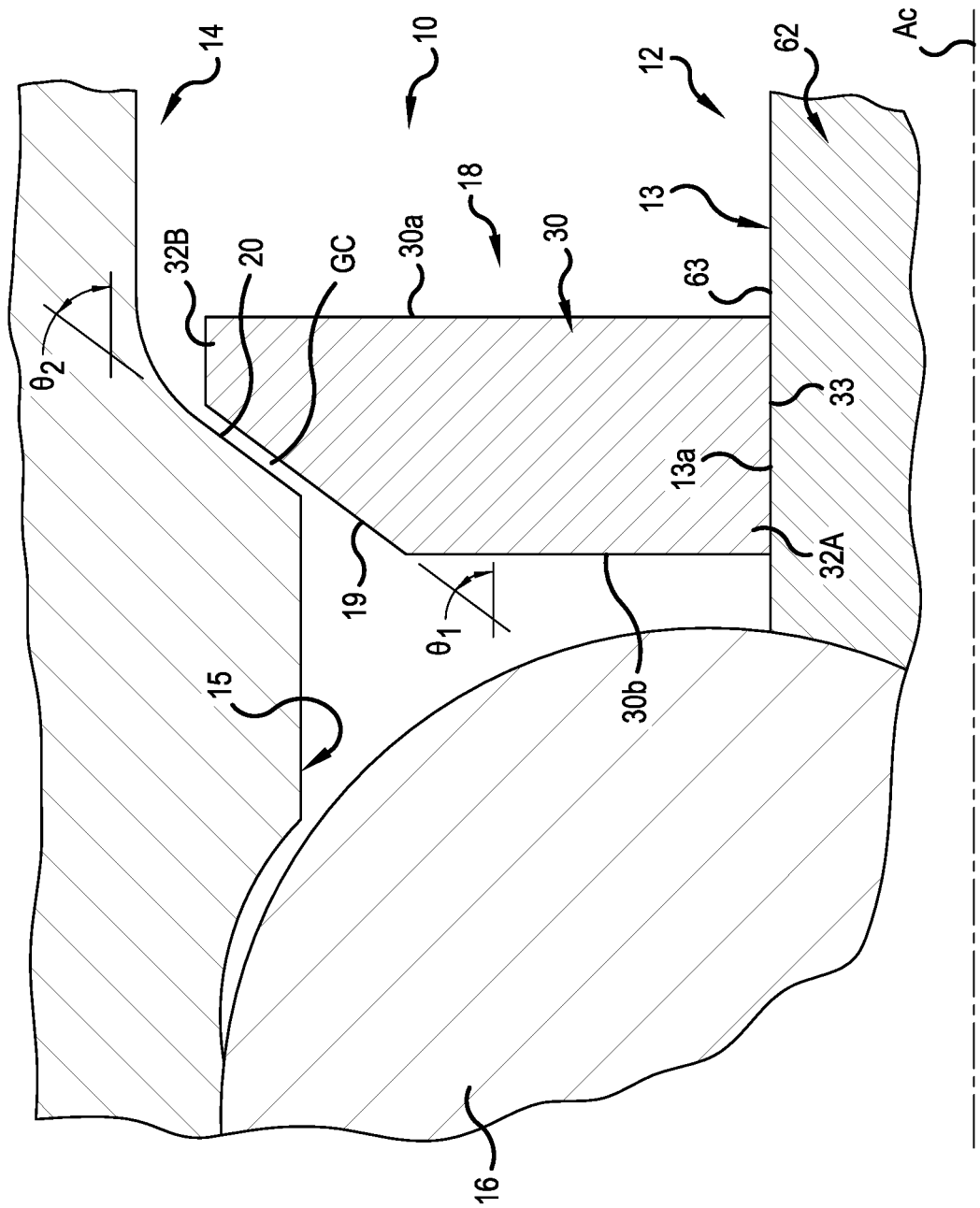
FIG. 3 is a more enlarged view of a portion of FIG. 2, showing the displacement limiter spaced from an engagement surface of the outer ring.
Figure 5:
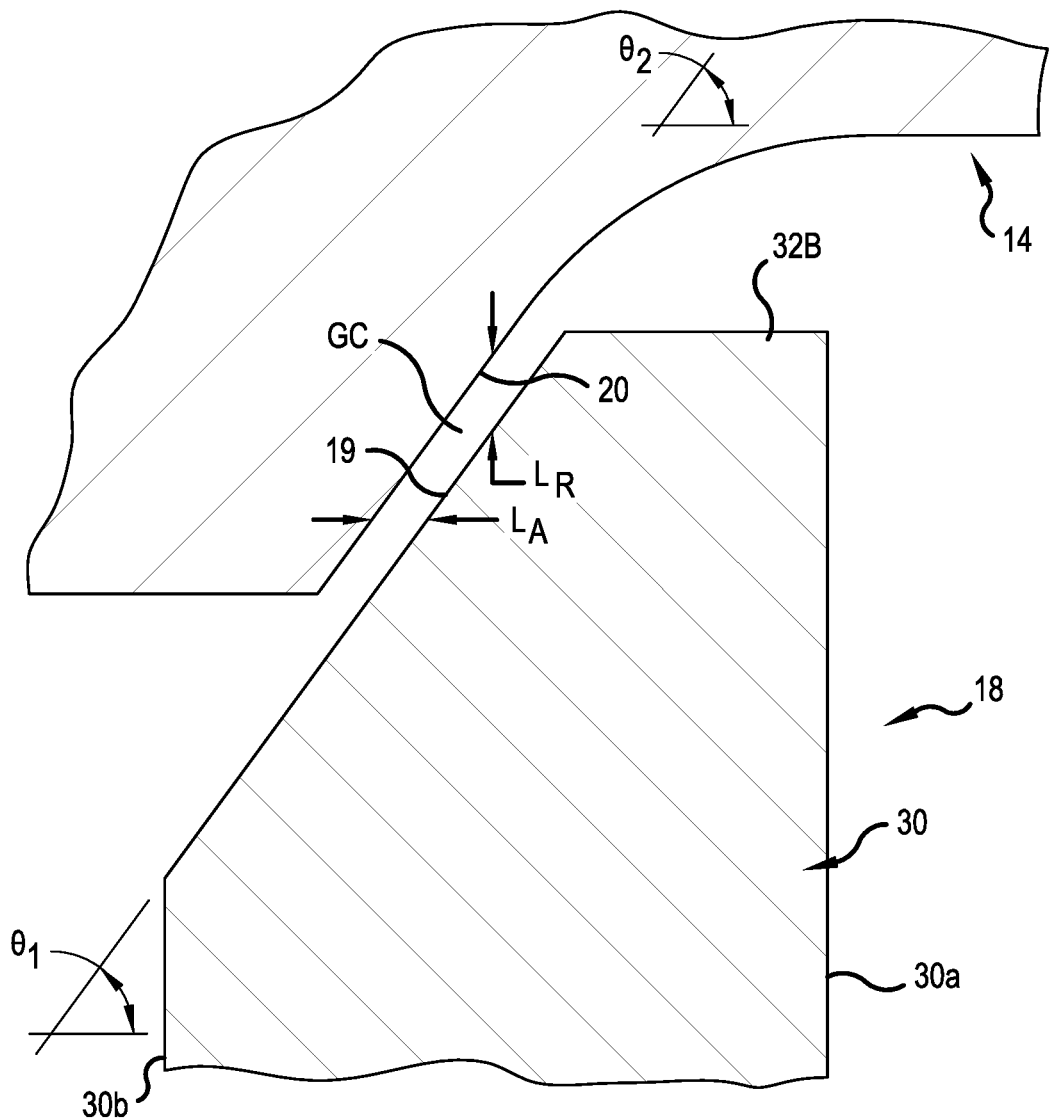
FIG. 5 is a greatly enlarged view of a portion of FIG. 3.
Figure 6:
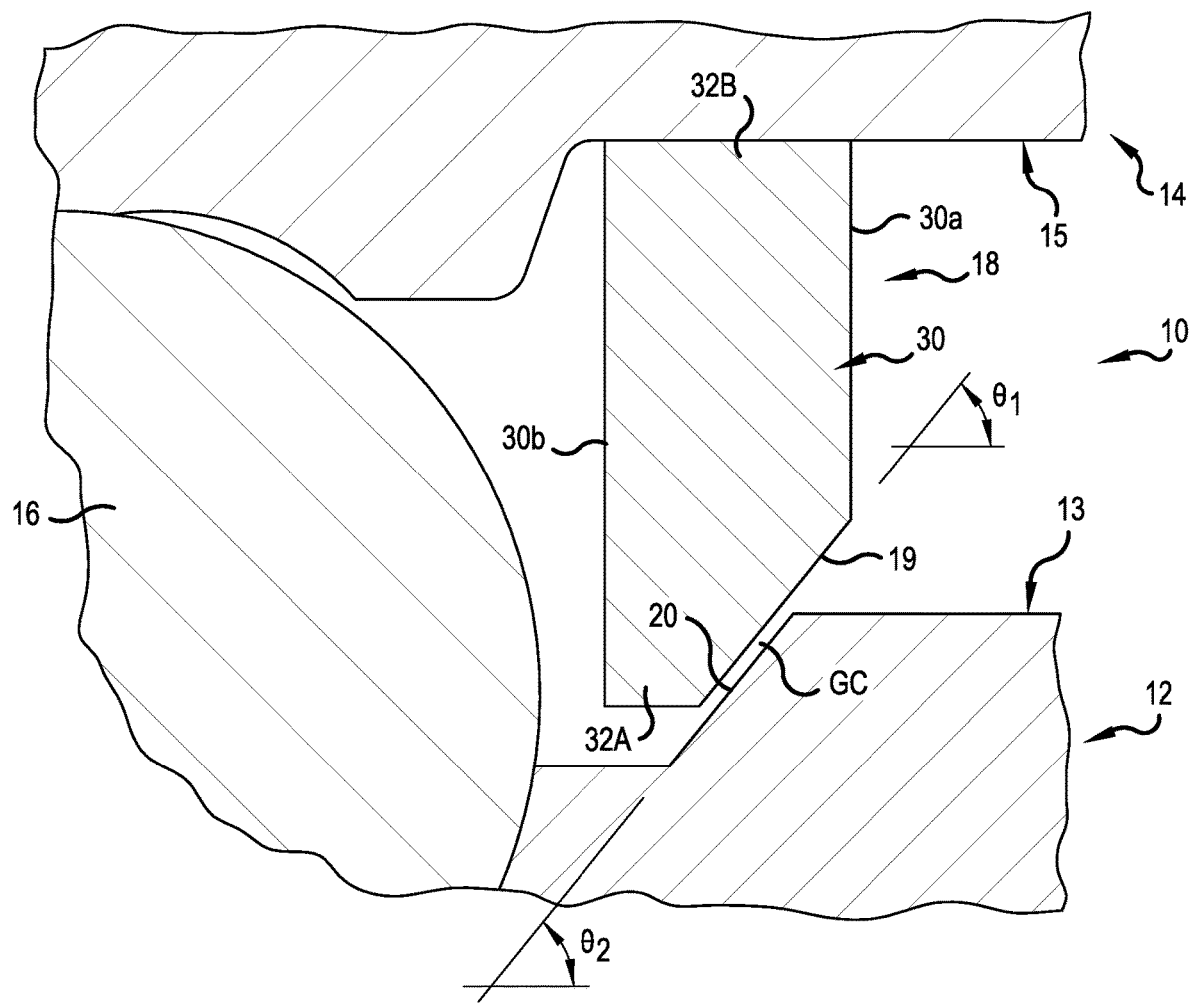
FIG. 6 is an axial cross-sectional view of an alternative construction of the hub bearing unit, showing a displacement limiter coupled with the outer ring and engageable with the inner ring.

Referring to FIGS. 3, 5 and 6, with the preferred complementary surfaces 19, 20, the stop surface 19 preferably defines a first angle $\theta_1$ with respect to the central axis $A_C$ and the engagement surface 20 defines a second angle $\theta_2$ with respect to the central axis $A_C$. Most preferably, the first and second angles $\theta_1$, $\theta_2$ have substantially the same value such that the two frustoconical surfaces 19 and 20 are substantially parallel, i.e., in any axial cross-section. As such, an angled annular control gap GC is defined between the stop surface 19 and the engagement surface 20, which is preferably arranged such that the shortest distance between the two surfaces 19, 20 is preferably has a value lesser than about 0.30 mm.

With this structure, the displacement limiter 18 is configured, i.e., sized radially or diametrically and positioned, and the value of each one of the first and second angles $\theta_1$, $\theta_2$ is selected such that the control gap GC has both a predetermined radial length $L_R$ and a predetermined axial length $L_A$, as indicated in FIG. 5. As such, relative radial displacement between the inner and outer rings 12, 14 is limited to the control gap radial length $L_R$ and relative axial displacement between the two rings 12, 14 is limited to the control gap axial length $L_A$.

Preferably, the radial length $L_R$ of the control gap GC has a value of between about 0.10 mm and about 0.31 mm and the axial length $L_A$ of the control gap GC has a value between about 0.57 mm and about 1.73 mm, for reasons discussed below. Further, the value of both the first and second angles $\theta_1$, $\theta_2$ is preferably between about ten degrees (10°) and about eighty degrees (80°), most preferably about seventy-five degrees (75°) to provide the desired relative magnitudes of the two gap lengths $L_R$, $L_A$. As is apparent, a value of about 45° provides substantially equal radial and axial lengths $L_R$, $L_A$. Further, the values of the first and second angles $\theta_1$, $\theta_2$ may be adjusted to vary the relative radial and axial lengths $L_R$, $L_A$ of the control gap GC, i.e., increasing the value decreases the radial length $L_R$ and increases the axial length $L_A$, and vice-versa, depending on the desired maximum permissible relative radial and axial displacements between the inner and outer rings 12, 14.

In any case, the control gap GC is sized as described above such that, under normal vehicle operating conditions, the one ring 12 or 14 coupled with the wheel 1 is freely rotatable about the central axis $A_C$. However, when an impact event occurs (e.g., wheel 1 hitting curb, pothole, etc.), the resulting radial and/or axial displacement of the wheel-coupled ring 12 or 14 relative to the other ring 14, 12 is prevented from exceeding the radial length $L_R$ and axial length $L_A$ of the control gap GC due to the movable ring 12 or 14 contacting the displacement limiter 18. As discussed above, excessive displacements of one ring 12 or 14 relative to the other ring 14, 12 can cause the rolling elements 16 to impact against the outer surfaces 22a, 26a of the races 22, 26 with sufficient force to indent the surfaces 22a, 26a, such indentations being referred to as "brinelling". Brinelling typically leads to excessive vibration or chattering of the rolling elements 16, and accelerates wear of the race surfaces 22a, 26a, leading to galling and/or spalling or the flaking off of bearing material.

Thus, by limiting relative radial and axial displacements between the inner and outer rings 12, 14, the displacement limiter 18 functions as an "anti-brinelling" device. Specifically, the preferred radial and axial lengths $L_R$, $L_A$ of the control gap GC as discussed above have been determined to prevent radial and axial displacements of a magnitude that may cause brinelling impacts while still permitting free relative rotation between the rings 12, 14 during normal vehicle operating conditions.

Figure 2:
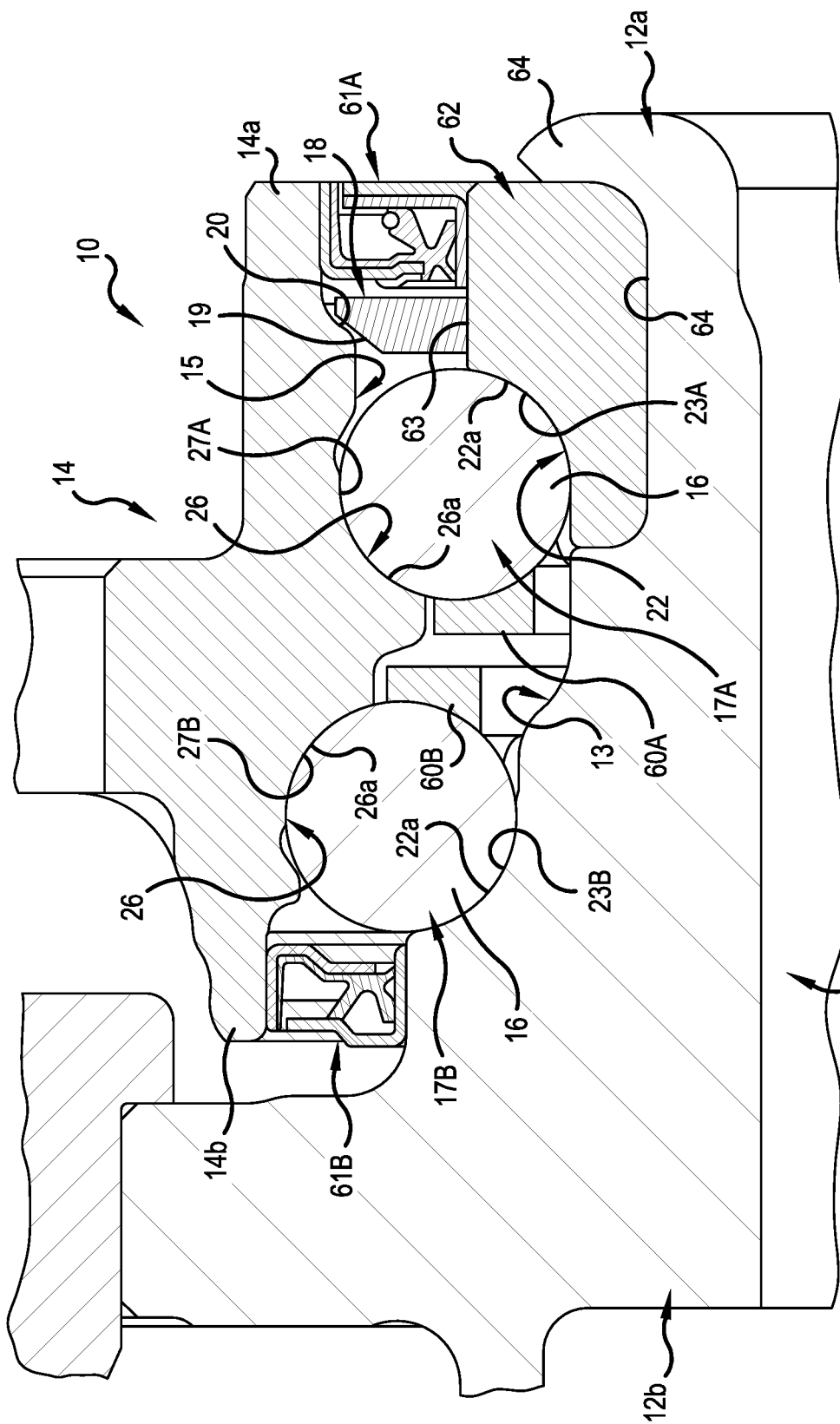
FIG. 2 is an enlarged view of an upper portion of FIG. 1.

Referring to FIGS. 1 and 2, the displacement limiter 18 is preferably located axially between the plurality of rolling elements 16, which preferably form an inboard row 17A of rolling elements 16 as described below, and the inboard axial end 12a, 14a of each one of the inner and outer rings 12, 14, respectively. As such, the limiter 18 functions to more effectively limit relative radial and axial displacements between the inboard axial end 12a of the inner ring 12 and the inboard axial end 14a of the outer ring 14, thereby better preserving the integrity of the surfaces of the inboard inner and outer races 23A, 27A, respectively, as described below.

Referring now to FIGS. 2, 3 and 6, the displacement limiter 18 is preferably formed as a single generally annular body 30 with opposing axial ends 30a, 30b and inner and outer radial ends 32A, 32B, one radial end 32A or 32B providing the frustoconical stop surface 19. The stop surface 19 is either substantially continuous about the central axis $A_C$ or is formed of a plurality of arcuate surface sections spaced circumferentially about the central axis $A_C$ (i.e., separated by radial recesses). Alternatively, the displacement limiter includes a plurality of arcuate body segments (not shown) spaced circumferentially about the central axis $A_C$, each arcuate body segment having opposing axial ends and inner and outer radial ends, one radial end having an arcuate frustoconical surface section providing a portion of the frustoconical stop surface (i.e., the plurality of surface sections collectively provide the stop surface). In either case, the single body 30 or the plurality of body segments is/are formed of a substantially rigid material, preferably a metallic material such as low carbon steel, but may be formed of any appropriate material, e.g., a rigid polymeric material or a ceramic material.

With either construction, the inner end 32A (or ends) of the displacement limiter 18 is/are preferably coupled with, but may alternatively integrally formed with, the inner ring 12 and the outer radial end 32B (or ends) is/are spaced radially inwardly from the inner surface 15 of the outer ring 14 and provides the frustoconical stop surface 19, as shown in FIGS. 1-5. Most preferably, the limiter 18 is provided by a washer-like body 30 having an inner circumferential surface 33 frictionally engaged (i.e., press-fit) with the outer surface 13 of the inner ring 12 so as to be removably coupled with the ring 12. Alternatively, as depicted in FIG. 6, the outer end 32B (or ends) of the displacement limiter 18 is/are coupled with, or may alternatively integrally formed with, the outer ring 14 and the inner radial end 32A or segment ends is/are spaced radially outwardly from the outer surface 13 of the inner ring 12 and provides the frustoconical stop surface 19.

Referring to FIGS. 1 and 2, the wheel hub unit 10 is preferably a double row bearing 11 including two sets of inner and outer races and two sets of rolling elements. Specifically, the inner ring 12 has a first, inboard inner race 23A and a second, outboard inner race 23B spaced axially from the first inner race 23A. Likewise, the outer ring 14 has a first, inboard outer race 27A and a second, outboard outer race 27B spaced axially from the first outer race 27A. Further, a first plurality or row 17A of rolling elements 16 is disposed between and rollable upon the first inner race 23A and the first outer race 27A and a second plurality/row 17B of rolling elements 16 is disposed between and rollable upon the second inner and outer races 23B, 27B, respectively.

With the preferred double row bearing 11, the displacement limiter 18 may alternatively be disposed between the two rows 17A, 17B or even outwardly of the second, outboard row 17B of rolling elements 16. Further, the double-row wheel hub unit 10 preferably further includes first and second cages 60A, 60B for relatively positioning and retaining each row 17A, 17B of rolling elements 16 and inboard and outboard seals 61A, 61B for retaining lubricant (e.g., grease) within the rolling elements 16 and repelling containments. Although a double row bearing is preferred, the wheel hub unit 10 may alternatively be formed so as to include only a single row (not shown) of rolling elements 16 for certain applications.

Still referring to FIGS. 1 and 2, the inner ring 12 preferably includes an annular insert 62 disposed within an annular groove 64 extending inwardly from the ring outer surface 13 and retained by a flange or rolled end 64 formed on the ring inboard end 12a. The insert 62 has an outer circumferential surface 63 providing the first, inboard inner race 23A and a section 13a of the ring outer surface 13. Preferably, the displacement limiter 18 is disposed about the section 13a of the insert outer surface 63 so as to be spaced axially from the inner race 23A toward the inner ring inboard end 12a, and is preferably frictionally retained on the insert 62. Alternatively, the displacement limiter 18 may be integrally formed with the insert 62 so as to extend radially outwardly from the insert outer surface 63 (structure not shown). Further, the second, outboard inner race 23B is preferably formed directly on the outer surface 13 of the inner ring 12, and both the first and second outer races 27A, 27B are formed directly on the inner surface 15 of the outer ring 14. However, the second inner race 23B or either or both of the outer races 27A, 27B may alternatively be provided by an appropriate annular insert (none shown) or/and the first inner race 23A may be alternatively directly formed on the outer surface 13 of the inner ring 12.

In certain presently preferred constructions as depicted, the inner ring 12 is a hub or "flanged inner ring" and includes a flange 66 formed on and extending radially outwardly from the inner ring outboard end 12b. The flange 66 is connectable with a wheel 1, preferably by means of a plurality of bolts 67, to thereby mount the wheel 1 to the wheel hub unit 10. As discussed above, in such a construction, the inner ring 1 is rotatable about the central axis $A_C$ and preferably the central bore 24 receives an end of a rotatable shaft 3 (FIG. 1) of the vehicle. Also, the outer ring 14 is connected with a steering mechanism or a suspension, preferably through a central flange 68 extending radially outwardly from the outer circumferential surface 70 of the outer ring 14.

However, the wheel hub unit 10 may alternatively be formed such that the outer ring 14 functions as a hub and has a flange (not shown) formed on, and extending radially outwardly from, the outboard end 14b of the ring 14. Such an outer ring flange is connectable with the wheel 1 so that the outer ring 14 is rotatable about the central axis $A_C$. Further, is such an alternative construction, the inner ring 12 is preferably mounted on a stub shaft (not shown) connected with a steering mechanism or a suspension.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A hub bearing unit for rotatably coupling a wheel with a vehicle frame, the hub bearing unit comprising:
   an inner ring having an inboard axial end, an outboard axial end, an outer circumferential surface and at least one bearing inner race disposed on the outer surface;
   an outer ring disposed about the inner ring and having an inboard axial end, an outboard axial end, an inner circumferential surface and at least one bearing outer race disposed on the ring inner surface, one of the inner ring and the outer ring being coupled with the wheel so as to rotate about a central axis and the other one of the inner ring and the outer ring being coupled with the frame;
   a plurality of rolling elements rollable upon the inner race and the outer race to rotatably couple the inner ring and the outer ring; and
   a displacement limiter extending radially from the inner ring outer surface or from the outer ring inner surface, the limiter having a generally frustoconical stop surface spaced radially from the outer ring inner surface or from the inner ring outer surface, the stop surface engaging with the outer ring or with the inner ring when one of the inner ring and the outer ring displaces radially or axially relative to the other one of the inner ring and the outer ring.

2. The hub bearing unit as recited in claim 1 wherein the stop surface is contactable with an engagement surface on one of the inner ring and the outer ring, the engagement surface extending both axially and radially with respect to the central axis.

3. The hub bearing unit as recited in claim 2 wherein the engagement surface is provided by a section of the outer surface of the inner ring or by a section of the inner surface of the outer ring.

4. The hub bearing unit as recited in claim 2 wherein the stop surface defines a first angle with respect to the central axis and the engagement surface defines a second angle with respect to the central axis, the first angle having a value equal to a value of the second angle.

5. The hub bearing unit as recited in claim 4 wherein an angled annular control gap is defined between the stop surface and the engagement surface, the displacement limiter being sized and the value of each one of the first angle and the second angle being selected such that the control gap has a predetermined radial length to limit relative radial displacement between the inner and outer rings to the control gap radial length and a predetermined axial length to limit relative axial displacement between the inner and outer rings to the control gap axial length.

6. The hub bearing unit as recited in claim 5 wherein the radial length of the control gap has a value of between 0.10 mm and 0.31 mm and the axial length of the control gap has a value between 0.57 mm and 1.73 mm.

7. The hub bearing unit as recited in claim 5 wherein the value of the first angle and the value of the second angle is between ten degrees (10°) and eighty degrees (80°).

8. The hub bearing unit as recited in claim 1 wherein the displacement limiter is located axially between the plurality of rolling elements and the inboard axial end of each one of the inner and outer rings so as to limit relative radial displacement and relative axial displacement between the inboard axial end of the inner ring and the inboard axial end of the outer ring.

9. The hub bearing unit as recited in claim 1 wherein one of:
   the displacement limiter has a first radial end coupled with or integrally formed with the inner ring and an opposing second radial end spaced radially inwardly from the outer ring outer surface and providing the stop surface; and
   the displacement limiter includes a generally annular body with a first radial end coupled with or integrally formed with the outer ring and an opposing second radial end spaced radially outwardly from the inner ring outer surface and providing the stop surface.

10. The hub bearing unit as recited in claim 1 wherein the displacement limiter is removably coupled with the inner ring or with the outer ring.

11. The hub bearing unit as recited in claim 1 wherein the displacement limiter includes a generally annular body with opposing axial ends and a radial end providing the stop surface, the stop surface being substantially continuous about the central axis.

12. The hub bearing unit as recited in claim 1 wherein the inner ring includes an annular insert having an outer circumferential surface providing the bearing inner race, the displacement limiter being disposed about a section of the insert outer surface and spaced axially from the inner race.

13. The hub bearing unit as recited in claim 1 wherein:
   the inner race is a first inner race and the inner ring further has a second inner race spaced axially from the first inner race;
   the outer race is a first outer race and the outer ring further has a second outer race spaced axially from the first outer race;
   the plurality of rolling elements is a first plurality of rolling elements and the hub bearing unit further comprises a second plurality of rolling elements rollable upon the second inner race and upon the second outer race.

14. The hub bearing unit as recited in claim 1 wherein the inner ring has a flange formed on the inner ring outer end, the flange being connectable with a wheel, the inner ring is rotatable about central axis and the outer ring is connectable with a steering mechanism or a suspension.

15. A hub bearing unit for rotatably coupling a wheel with a vehicle frame, the hub bearing unit comprising:
   an inner ring coupled with the wheel so as to be rotatable about a central axis, the inner ring having an inboard axial end, an outboard axial end, an outer circumferential surface and at least one bearing inner race disposed on the outer surface;
   an outer ring coupled with the frame and disposed about the inner ring and having an inboard axial end, an outboard axial end, an inner circumferential surface, at least one bearing outer race disposed on the ring inner surface and a concave, generally frustoconical surface section on the inner surface;
   a plurality of rolling elements rollable upon the inner race and the outer race to rotatably couple the inner ring and the outer ring; and
   a displacement limiter extending radially from the inner ring outer surface and having a convex, generally frustoconical stop surface spaced radially and axially from the engagement surface section of the outer ring, the limiter being configured such that the stop surface contacts the engagement surface when the inner ring displaces radially or axially relative to the outer ring.

16. The hub bearing unit as recited in claim 15 wherein the stop surface defines a first angle with respect to the central axis and the engagement surface defines a second angle with respect to the central axis, the first angle having a value equal to a value of the second angle.

17. The hub bearing unit as recited in claim 16 wherein an angled annular control gap is defined between the stop surface and the engagement surface, the displacement limiter being sized and the value of each one of the first angle and the second angle being selected such that the control gap has a predetermined radial length to limit relative radial displacement between the inner and outer rings to the control gap radial length and a predetermined axial length to limit relative axial displacement between the inner and outer rings to the control gap axial length.

18. The hub bearing unit as recited in claim 15 wherein the displacement limiter is located axially between the plurality of rolling elements and the inboard axial end of each one of the inner and outer rings so as to limit relative radial displacement and relative axial displacement between the inboard axial end of the inner ring and the inboard axial end of the outer ring.

19. The hub bearing unit as recited in claim 15 wherein the displacement limiter includes a generally annular body with opposing axial ends and radial end providing the stop surface, the stop surface being substantially continuous about the central axis.

20. The hub bearing unit as recited in claim 15 wherein the displacement limiter is removably coupled with the inner ring.

\* \* \* \* \*